United States Patent Office 2,824,467
Patented Feb. 25, 1958

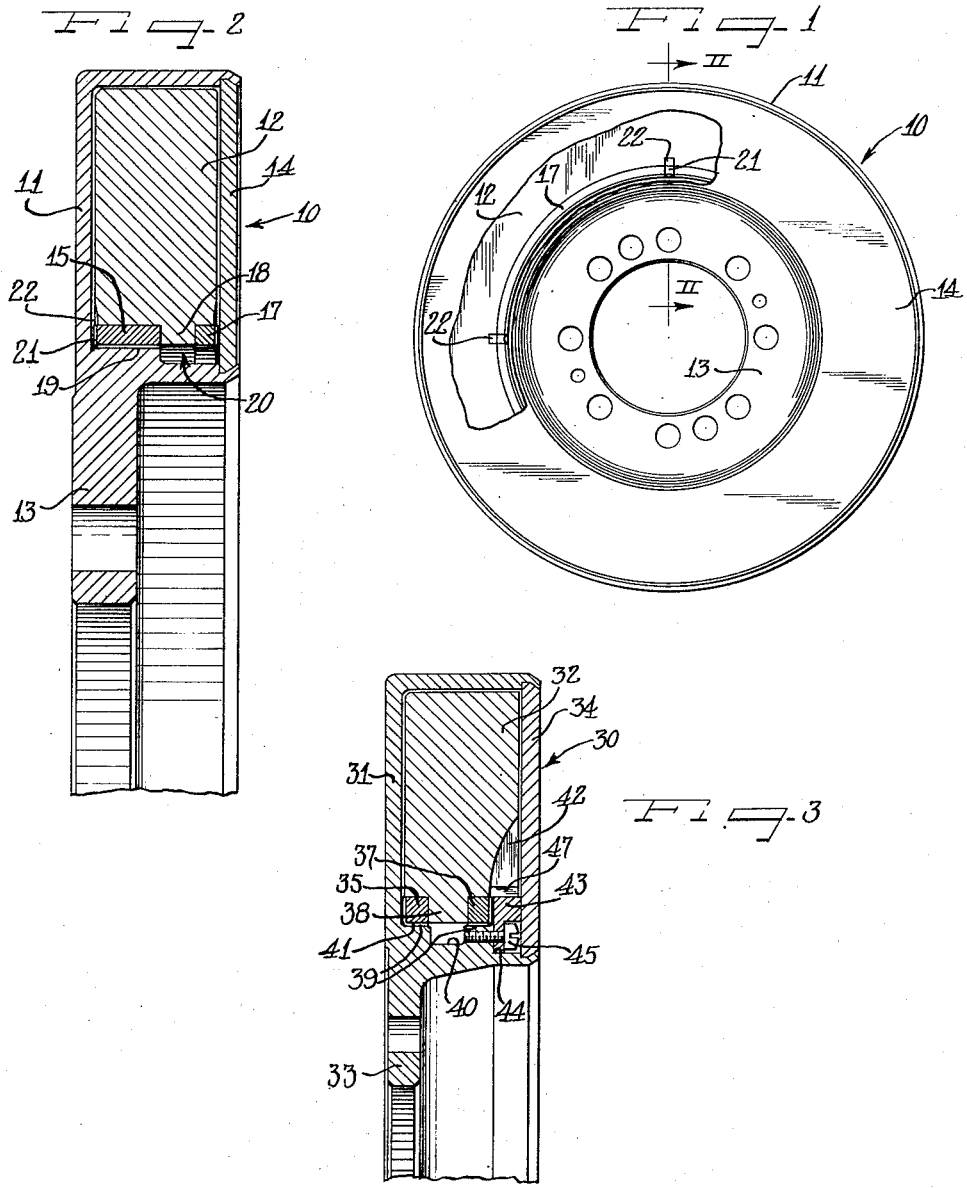

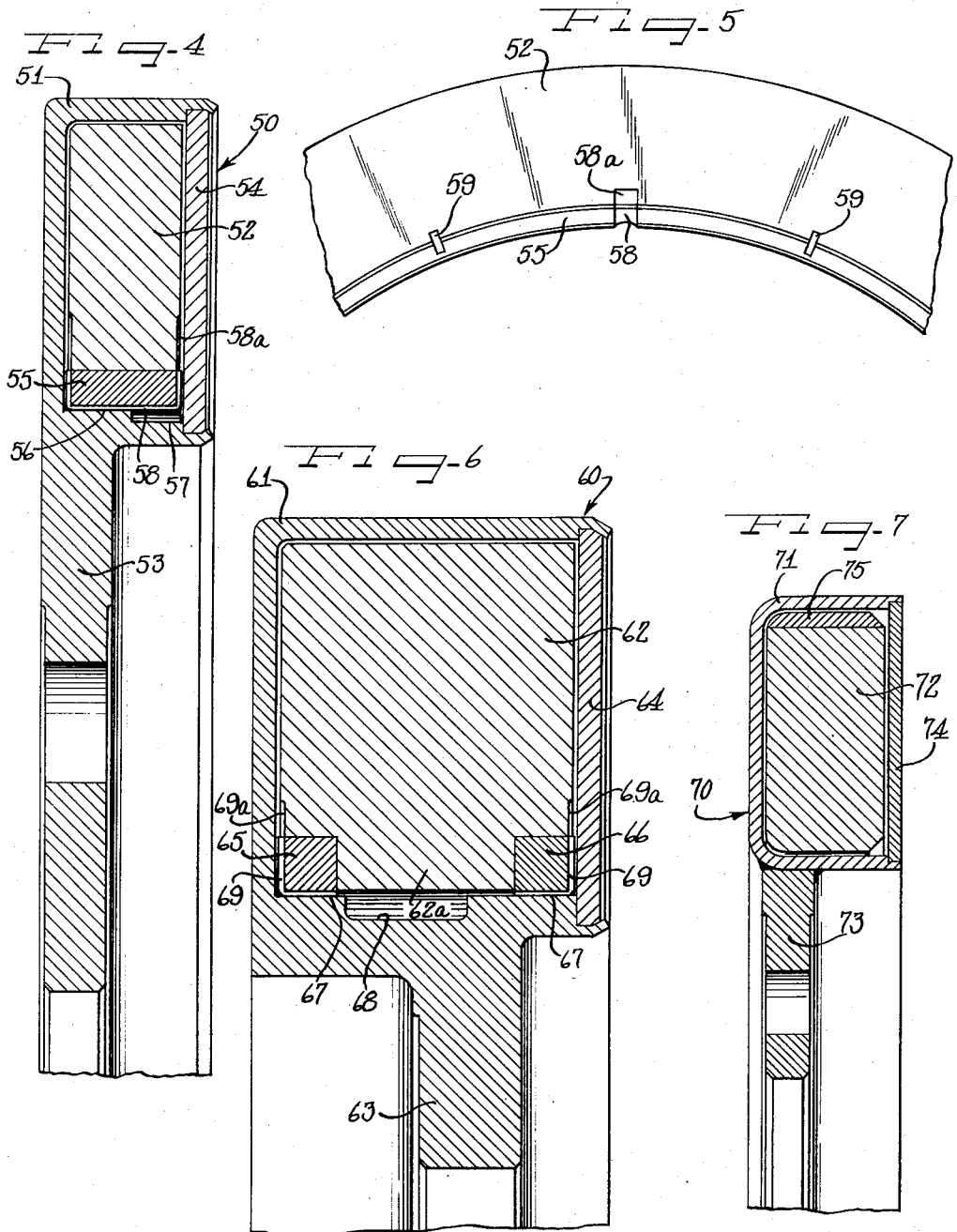

2,824,467

BEARING STRUCTURE FOR VISCOUS CRANKSHAFT DAMPERS

Bernard E. O'Connor, Buffalo, N. Y., assignor to Houdaille Industries, Inc., a corporation of Michigan Application September 27, 1952, Serial No. 311,887

18 Claims. (Cl. 74—574)

The present invention relates to improvements in viscous crankshaft dampers of the kind utilizing silicone fluid as the coupling medium between opposing closely spaced working surfaces of an inertia ring and a housing within which the inertia ring is operatively supported.

In certain severe crankshaft damper applications trouble has been experienced due to the incompatibility of ferrous metals and the silicone coupling or damping fluid used in the vibration dampers. Where opposing ferrous surfaces engage in direct bearing relation a silicone fluid has no lubricating value. Therefore, even though a silicone fluid is of viscosity rating that in a conventional lubricating oil would afford proper lubrication, it nevertheless leaves the directly engaging ferrous surfaces in substantially unlubricated, high coefficient of friction relation resulting in substantial binding of the surfaces, especially in the presence of heat such as may be encountered in a crankshaft damper. In a torsional vibration damper such binding is quite undesirable.

While protection of the opposing ferrous surfaces in a viscous torsional vibration damper is satisfactorily accomplished in various practical instances by plating one or more of the surfaces with a non-ferrous metal such as cadmium, under those service conditions where the flywheel will in operation rub on the housing, abrasion and scoring of the cadmium plating occurs, exposing the ferrous surfaces to direct contact and thus binding.

It is accordingly an important object of the present invention to provide improved means in viscous torsional vibration dampers for avoiding direct contact of the surfaces in bearing relation in the presence of silicone fluid, where the surfaces are incompatible with the silicone as a lubricant.

Another object of the invention is to provide an improved relation between opposing ferrous working surfaces in a viscous torsional vibration damper utilizing silicone as a coupling and damping fluid, by which the surfaces are maintained in positively spaced operative relation in the presence of service conditions which would tend to cause direct frictional interengagement of the surfaces.

A further object of the invention is to provide improved bearing structure for viscous torsional vibration dampers.

Yet another object of the invention is to improve torsional vibration dampers operating on the shear film principle.

Other objects, features and advantages of the present invention will be readily apparent from the following detailed description of certain preferred embodiments thereof taken in conjunction with the accompanying drawings, in which:

Figure 1 is a side elevational view, partially broken away for revealing details of internal structure, of a viscous torsional crankshaft vibration damper embodying features of the invention;

Figure 2 is an enlarged radial sectional view taken substantially on the line II—II of Figure 1;

Figure 3 is a radial sectional view through a modified form of the damper construction;

Figure 4 is a radial sectional view through a damper disclosing a further modification;

Figure 5 is a fragmentary side elevational view of the inertia member or flywheel of the damper of Figure 4;

Figure 6 is a fragmentary, radial sectional view through a further modification; and Figure 7 is a fragmentary radial sectional view through still another modification.

In all forms of the invention disclosed it will be understood that the inertia or flywheel member and the housing are constructed of materials which in the presence of a silicone lubricant are incompatible, that is, will resist relative sliding movement when in bearing engagement. The inertia members may be cast iron while the housings may be made from malleable or other steel.

The dampers with which the present invention is concerned employ as a shear film coupling medium between opposing closely spaced working surfaces of the inertia member and the housing a silicone, a practical commercial example of which is identified as Dow-Corning fluid type 200, having a viscosity rating of approximately 60,000 centistokes at 77° F. The housing of the damper is constructed and arranged to be secured concentrically for rotation with a torsionally oscillating or vibrating mass such as a driven rotary shaft or crankshaft of a machine, internal combustion engine, or the like, and of which diesel engines are an example. An inertia ring or flywheel member is so disposed in spaced, relatively rotatable relation in the housing so that opposing parallel working surfaces of the flywheel and the housing are in shear film spaced relation with respect to the viscous silicone fluid in the housing. That is, the viscous fluid is present between the opposing parallel working surfaces of the flywheel and the housing in films which are thicker than a mere lubricating film but which are of less thickness than a layer which will produce only a fluid drag relationship.

In normal rotary operation of the associated crankshaft, the damper housing rotates fixedly with the crankshaft and the viscous silicone fluid coupling between the working surfaces of the flywheel and the housing causes the flywheel to rotate with the housing. When the crankshaft tends to oscillate or vibrate in operation the same characteristics of the viscous fluid which cause rotation of the flywheel with the housing and the shaft also resist the torsional oscillatory or vibrational movements of the shaft as transmitted through the housing. The force necessary to shear the viscous film between the flywheel surfaces and the companion work surfaces of the housing is proportional to the relative angular velocity between the flywheel and the housing work surfaces.

Ideally, all opposing surfaces of the flywheel and the housing should be in spaced relation so that the flywheel substantially floats in the viscous fluid in the housing. However, under many practical conditions movements other than rotary or oscillatory must be taken into account since they will tend to cause the flywheel and the housing to move out of the ideal floating relationship of the flywheel and cause frictional interengagement of opposing surfaces, and more especially opposing working surfaces of the flywheel and housing.

While plating the opposing ferrous surfaces of the flywheel and housing with a non-ferrous metal such as cadmuim will reduce the frictional resistance of such surfaces if they contact since the silicone fluid will provide a lubricating film between the non-ferrous surfaces, the wearing through or scoring of the non-ferrous coating due to severe conditions exposes the ferrous surfaces to one another and due to the incompatibility of the silicone fluid produces a binding condition which will render the damper inoperative.

According to the present invention the flywheel members of the dampers are provided with non-ferrous bearing means which will prevent direct contact of opposing ferrous working surfaces in the damper unit, or at least will prevent contact of such opposing ferrous surfaces where they are likely to bind in the presence of the silicone viscous damping fluid.

Having reference to Figures 1 and 2, a viscous torsional vibration damper 10 is shown comprising a casing or housing 11 defining an annular chamber within which is housed an inertia ring or flywheel member 12. The housing 11 is provided with a central hub flange 13 by which it is adapted to be secured to the end of a rotary member such as a crankshaft subject to torsional oscillations or vibrations to be damped. At one side of the housing 11 the annular flywheel chamber is initially open but is closed in assembly by an annular closure disk or plate 14, the margins of the closure plate and the housing being appropriately permanently sealed in fluid tight relation. The closure plate 14 thereby becomes a functionally integral part of the housing.

The outer peripheral and the axially facing surfaces of the flywheel ring 12 oppose in parallel relation substantially complementary internal surfaces of the housing 11 within the flywheel chamber. The opposing surfaces are thus in working relationship and a silicone fluid of the type mentioned hereinabove provides viscous coupling in shear films between the opposed working surfaces. The surfaces of the flywheel member or the internal surfaces of the housing, or both may be plated with a non-ferrous coating such as cadmium.

In order to prevent direct frictional engagement of the opposing working surfaces within the damper 10, the flywheel ring 12 is provided with bearing means at its inner diameter, herein comprising a pair of annular bearing ring members 15 and 17 separated by and engaging against a lateral or axial thrust shoulder flange 18 extending radially inwardly about the inner diameter of the flywheel ring.

The inner diameter of at least the bearing ring member 15 is cylindrical and bearingly opposes a cylindrical bearing surface 19 about the hub portion of the housing within the flywheel chamber.

Opposite the bearing ring 17 and the flange shoulder 18, the hub wall defining the flywheel chamber is rabbet-grooved to provide an annular reservoir 20. Within this reservoir a volume of the viscous fluid for lubricating the bearings is provided.

Each of the bearing rings 15 and 17 extends a limited distance laterally or axially beyond the associated side or axial face of the flywheel member, but less than the shear film spacing between the side or axial working faces and the opposing axially facing surfaces of the housing. For example, a clearance allowance of from .004 to .008 inch per side may be provided in a typical example. Through this arrangement the side or axially facing exposed surfaces of the bearing rings 15 and 17 will not normally be in bearing relation to the opposing axially facing surfaces of the housing, but in the presence of axial momentum in either direction which might tend to drive the flywheel ring 12 toward either of the opposing axially facing working surfaces within the housing, the appropriate bearing ring member will bear against the housing working surface as a bearing spacer and prevent direct and bearing contact between the flywheel and the housing.

By having the bearing ring members 15 and 17 formed from a non-ferrous material such as bronze several advantages are attained. The most important advantage, of course, resides in that the bearings afford only a very limited axially facing bearing area. Furthermore, the problem of binding in the presence of the silicone fluid between the bronze bearing surfaces of the rings and the opposing ferrous surfaces of the housing is practically eliminated since the silicone fluid will provide bearing lubrication. In addition, the fit of the bronze bearings, which are preferably assembled with the flywheel by interference fit, improves as the damper attains operating temperature due to the relative difference in the linear coefficients of expansion of the materials of the flywheel ring and the bearings. This assures tight bearings.

In order to assure bearing lubrication as well as to provide pathways for the silicone fluid from the reservoir 20 to the working gaps or shear film spacings, the bearing faces of the bearing rings 15 and 17 are preferably provided with appropriate spaced indentations 21 which may be four in number equidistantly spaced about the inner periphery of the flywheel in the form of transverse grooves with radial side extensions leading to clearance notch extensions 22 registering therewith in the adjacent portion of the side surfaces of the flywheel member. Thereby fluid from the reservoir 20 can escape through the passage channels or grooves in the bearing surfaces of the bearing members under centrifugal force in operation, and further assurance is had that the silicone fluid will uniformly enter between the opposing axially facing bearing surfaces of the bearing members 15 and 17 and the chamber walls of the housing.

Under conditions where unusually severe fore and aft motion is transmitted from the engine crankshaft to the damper, a construction as shown in Figure 3 may be used. Therein a viscous torsional vibration damper 30 comprises a casing or housing 31 provided with an annular flywheel chamber within which is operatively housed an inertia ring or flywheel member 32. The housing 31 has a central hub flange 33 from which the unit is adapted to be attached to the end of a rotary member such as an engine crankshaft subject to torsional or oscillatory vibrations requiring damping. The flywheel chamber is initially open toward one side of the housing 31 and is closed in assembly by a closure ring disk or plate 34 which is marginally secured to the margins of the housing defining the flywheel chamber in fluid tight hermetically sealed relation. The opposing axially facing and outer peripheral walls of the flywheel member 32 and the housing are in working gap or shear film gap relationship relative to a viscous silicone fluid substantially filling the chamber about the flywheel member.

Radial and axial thrust bearing means are provided in the form of a pair of bearing rings 35 and 37 press or interference fitted to the inner diameter portion of the inertia ring 32 and spaced apart by a radially inwardly extending radial thrust flange 38 on the flywheel member. The hub wall portion of the housing 31 defining the inertia ring chamber is provided with cylindrical bearing surfaces 39 against which the bearing rings 35 and 37 bear in relatively rotary bearing relation at their inner diameters. An annular reservoir groove or channel 40 in the hub wall portion of the chamber 31 is adapted to contain a bearing-lubricating supply of silicone fluid and also a surplus supply for assuring complete filling of all of the shear film gaps between the flywheel member and the housing chamber wall surfaces in operation. Lubricant flow grooves 41 are provided at appropriate intervals transversely along the inner diameters and radially along the outer faces of the bearing rings 35 and 37. Flow passage notches or indentations 42 are provided in at least one axial face of the inertia ring member 32 for communication with the flow notches or grooves 41 of one of the bearing rings, herein the bearing ring 37.

For axial thrust absorption with minimum resistance in the presence of the silicone fluid lubricant, an annular thrust plate or ring 43 is provided which is set into a rabbet groove 44 in the hub portion of the housing 31 inside the cover plate 34 and secured in place by means such as screws 45. The thrust plate 43 is of a diameter to extend into lateral thrust relation to the outer side of the bearing ring 37. To accommodate the thrust bearing portions of the plate 43, the bearing ring 37 is inset and with its axially extending and projecting bearing face within a rabbet clearance groove 47 in the adjacent side of the inertia ring 32.

In the modification of Figures 4 and 5 is depicted a viscous torsional crankshaft vibration damper 50 comprising a casing or housing 51 having an axially opening inertia chamber housing, an inertia ring or flywheel member 52 and having a central hub flange 53 by which the assembly is adapted to be attached to the end of a rotary mass subject to oscillatory or torsional vibrations such as a crankshaft. The flywheel chamber is closed by a hermetically sealed closure ring plate 54. At its inner diameter the inertia member 52 has a single bearing ring 55 press or interference fitted thereto and cooperating in radial bearing relation with a cylindrical bearing surface 56 at the hub portion of the casing defining the flywheel chamber while the opposite ends of the bearing ring project slightly beyond the axially directed working faces of the flywheel ring for limiting axial movement of the flywheel. An annular reservoir channel or groove 57 in the hub portion of the casing 51 communicates by way of transverse lubricating and replenishing grooves 58 in the inner diameter of the bearing ring 55 and having radial extensions leading into feeder notches or grooves 58a in the adjacent portion of the axially facing working surfaces of the inertia ring. It will be understood that in the damper 50 as in the other forms of the damper hereinabove described, a silicone damping fluid substantially fills the shear film working spaces or gaps between the opposing parallel working surfaces of the housing and the inertia ring member.

In this form of the invention, means are provided for positively holding the bearing ring 55 against any possibility of relative rotation with respect to the inertia ring 52. For this purpose the bearing ring 55 has means such as radial staking members 59 which are set into respective registering notches in the adjacent portion of the inertia ring.

In the modification of Figure 6 is shown an arrangement similar to the modification of Figure 3 but adapted for an application where fore and aft or axial thrust is not especially a problem. Accordingly, a torsional viscous crankshaft vibration damper 60 is provided including a housing 61 providing an axially opening inertia ring chamber within which is housed a flywheel ring 62, and having a central bolt-on flange 63 by which the assembly or damper unit is adapted to be attached to the end of a rotary mass subject to oscillatory or torsional vibrations requiring damping. A closure plate 64 is hermetically sealed in working closing relation to the open side of the housing. A pair of bearing rings 65 and 66 are secured to the inner diameter portion of the inertia ring 62 and having the inner diameters thereof in bearing relation to respective cylindrical opposing bearing surfaces 67 at the hub portion of the housing 61 within the flywheel chamber. The outer or axially facing sides of the bearing rings 65 and 66 project slightly beyond the axially facing working surfaces of the flywheel member 62 to limit axial movement of the flywheel member in the flywheel chamber. A radially inwardly directed thrust shoulder flange 62a intervenes between and spaces the bearing rings 65 and 66. An annular reservoir chamber 68 for a supply of silicone fluid for replenishing the working shear film spaces or gaps between the flywheel and the housing and for lubricating the bearings 65 and 66 is provided in the hub portion of the flywheel chamber between the cylindrical bearing surfaces 67. Lubricant grooves 69 are provided in the bearing surfaces of the bearing rings 65 and 66 and communicate with feed notches 69a in the adjacent portion of the axially facing working surfaces of the flywheel member.

The modification shown in Figure 7 provides a viscous torsional crankshaft vibration damper 70 adapted for uses where fore and aft motion tending to cause rubbing of the axially facing working surfaces of the housing and flywheel is not a problem and where an operationally floating flywheel is desirable. Accordingly, the damper 70 comprises an annular casing or housing 71 which may be formed as a generally ring-shaped stamping of sheet steel with an inertia ring or flywheel member 72 housed within an axially opening flywheel chamber provided by the housing. A hub flange 73 is secured to the inner perimeter of the casing 71 and provided for bolting the damper to a rotary member subject to oscillatory or torsional vibrations, such as a crankshaft. A closure ring plate 74 is secured in hermetically sealed relation across the opening from the flywheel chamber and becomes a functionally integral part of the housing with its inner face providing a working surface cooperating with an opposing axially facing working surface of the flywheel.

Not only is the flywheel member 72 operationally spaced both at its axially facing surfaces and at its outer perimeter surface from the opposing surfaces of the housing, but the flywheel ring is also spaced at its inner peripheral surface from the opposing surface of the housing, and the spaces are substantially filled with silicone viscous damping fluid. During operation, centrifugal force drives the viscous fluid into supporting relation to the flywheel ring both at its axial and its outer peripheral surface and the flywheel ring therefore assumes a centered floating, balanced working position within the housing during the rotary operation of the damper. On the other hand, during non-operating periods, the flywheel ring 72 sags down since the hydraulic fluid is then relieved from the radially outward centrifugal pressure.

Herein provision is made for engagement of the outer periphery of the flywheel 72 with the opposing outer peripheral wall of the housing and the bearing ring 75 is provided as a rim around the outer periphery of the flywheel to afford a metallic surface which is more compatible with the silicone damping fluid during rubbing, bearing interengagement of the flywheel periphery with the opposing surface of the housing within the flywheel chamber. Although under more severe fore and aft thrust movement conditions it might be desirable to provide the bearing 75 with axially projecting spacer portions opposing the adjacent axially facing working surfaces of the housing to limit axial relative movement of the inertia ring, in the illustrated form of the damper 70, no such axial projections have been provided since the specified damper shown is, as hereinabove noted, adapted for less severe operating conditions but where some rubbing of the periphery of the flywheel will occur against the housing during deceleration and acceleration of the crankshaft, or during violent radial movements of the machine with which the crankshaft is associated. It will be observed that in the damper 70 the space between the inner diameter of the flywheel ring and the hub wall portion of the housing is slightly greater than the shear film working space between the outer periphery of the flywheel, including the bearing ring 75 and the outer peripheral wall of the housing, so as to avoid any possibility of frictional bearing engagement of the inner diameter of the flywheel with the hub wall portion of the housing during slack periods when the flywheel rests against the outer peripheral wall of the housing.

In all forms of the invention the non-ferrous flywheel bearings are preferably treated to present oxide-free surfaces to the silicone fluid. Coating or plating the exposed surfaces of the bearing members with a non-oxidizable material is preferred. For example, flash plating with cadmium, or zinc plating are practical means for coating the bronze or other non-ferrous bearing rings against oxidation, corrosion or chemical or heat action on the exposed surfaces that might be deleterious to the viscous silicone damping fluid.

It will be understood that modifications and variations may be effected without departing from the scope of the novel concepts of the present invention.

I claim as my invention:

1. In combination in a viscous torsional crankshaft vibration damper a ferrous housing providing a flywheel chamber, a ferrous flywheel relatively rotatably disposed in said chamber, said flywheel and said housing having opposed parallel working surfaces in shear film spaced relation, a viscous silicone fluid in said chamber and providing a shear film of the fluid in the space between said working surfaces, and non-ferrous bearing means carried by said flywheel and engageable with an opposing surface of the housing within said chamber and from which the flywheel must be held against direct engagement, due to the ferrous nature thereof, to avoid binding in the presence of said silicone fluid.

2. In combination in a viscous torsional vibration damper, a housing defining a flywheel chamber, a flywheel rotatably mounted in said chamber, a viscous damping fluid in said chamber, said flywheel and said housing having opposing parallel working surfaces in shear film spaced operative relation, said flywheel being axially as well as rotatably movable in said housing, and bearing means carried by said flywheel and engageable in radial bearing relation with a portion of said housing within said chamber, said bearing means being on the outer periphery of the flywheel.

3. In a flywheel ring member for use in a torsional viscous vibration damper, a flywheel ring of ferrous material, a pair of non-ferrous bearing rings secured to one diameter of said flywheel ring, and thrust shoulder means on said flywheel ring between said bearing rings, said bearing rings having radially and axially extending surfaces projecting beyond the adjacent surfaces of the flywheel ring.

4. In a flywheel member for use in a viscous torsional vibration damper, a flywheel body, a solid bearing annulus attached to and carried by said body, and transverse lubrication and fluid flow grooves in said bearing annulus, said flywheel body having fluid flow notches therein registering with said grooves and extending therefrom.

5. In a viscous torsional vibration damper, a housing defining a flywheel ring chamber, a flywheel ring in said chamber, said chamber and said flywheel ring having outer peripheral and axially facing surfaces in shear film spaced working relation, a silicone viscous fluid providing a shear film coupling between said surfaces, said flywheel ring having at the inner diameter thereof bearing structure, said housing having a bearing surface engageable by said bearing structure, said bearing structure being fixedly secured to said flywheel ring, said housing having an annular reservoir groove in the wall defining the inner diameter of said chamber and adjacent to said bearing surface.

6. In a viscous torsional vibration damper, a housing defining a flywheel ring chamber, a flywheel ring in said chamber, said chamber and said flywheel ring having outer peripheral and axially facing surfaces in shear film spaced working relation, a silicone viscous fluid providing a shear film coupling between said surfaces, said flywheel ring having at the inner diameter thereof bearing structure, said housing having a bearing surface engageable by said bearing structure, said bearing structure being fixedly secured to said flywheel ring, said housing having an annular reservoir groove in the wall defining the inner diameter of said chamber and adjacent to said bearing surface, said bearing structure having lubricant distribution grooves leading from said reservoir groove.

7. In combination in a torsional vibration damper, a housing defining an annular flywheel chamber, an annular flywheel within said chamber, said housing and said flywheel being of ferrous material, a viscous silicone fluid in said housing providing a viscous damping coupling between the flywheel and the housing within said chamber, and non-ferrous bearing means carried by the flywheel and maintaining the flywheel against contact with the housing in said chamber contiguous the bearing means, said bearing means being at the outer periphery of the flywheel.

8. In combination in a torsional vibration damper, a housing defining an annular flywheel chamber, a generally complementary flywheel ring within said chamber, said housing and said flywheel being of ferrous material, a viscous silicone fluid in said housing providing a viscous damping coupling between the flywheel ring and the housing within said chamber, and non-ferrous bearing means carried by the flywheel ring and maintaining the flywheel ring against contact with the housing in said chamber contiguous the bearing, the housing having a thrust plate ring bearingly opposing a side of said bearing means.

9. In combination in a viscous torsional vibration damper, a housing having an annular flywheel chamber therein, an annular flywheel in said chamber, said flywheel and said housing being of ferrous material, the outer periphery and the axially facing surfaces of the flywheel and the opposing surfaces of the housing in the chamber being in shear film spaced relation, a silicone viscous coupling fluid in said chamber providing shear films of fluid between said surfaces, a pair of spaced non-ferrous bearing rings carried by the inner diameter portion of the flywheel and projecting slightly axially beyond the respective opposite axially facing surfaces of the flywheel for limiting axial movement of the flywheel within the chamber and maintaining the axially facing surfaces thereof out of bearing engagement with the opposing axially facing surfaces defining the chamber, and a radially extending thrust shoulder on said flywheel maintaining said bearing rings in spaced relation.

10. In combination in a viscous torsional vibration damper, a housing having an annular flywheel chamber therein, an annular flywheel in said chamber, said flywheel and said housing being of ferrous material, the outer periphery and the axially facing surfaces of the flywheel and the opposing surfaces of the housing in the chamber being in shear film spaced relation, a silicone viscous coupling fluid in said chamber providing shear films of fluid between said surfaces, a pair of spaced non-ferrous bearing rings carried by the inner diameter portion of the flywheel and projecting slightly axially beyond the respective opposite axially facing surfaces of the flywheel for limiting axial movement of the flywheel within the chamber and maintaining the axially facing surfaces thereof out of bearing engagement with the opposing axially facing surfaces defining the chamber, and a radially extending thrust shoulder on said flywheel maintaining said bearing rings in spaced relation, said housing having within said chamber a thrust plate ring axially opposing one of said bearing rings.

11. In combination in a torsional viscous vibration damper, a ferrous housing providing a flywheel chamber, a ferrous flywheel in said chamber, a viscous silicone damping fluid in said chamber, and non-ferrous means maintaining the flywheel out of direct contact with the walls of the housing defining said chamber.

12. In combination in a torsional viscous vibration damper, a ferrous housing providing a flywheel chamber, a ferrous flywheel in said chamber, a viscous silicone damping fluid in said chamber, and non-ferrous means maintaining the flywheel out of direct contact with the walls of the housing defining said chamber, said means comprising a bearing ring member having a non-ferrous coating exposed to the silicone fluid and chemically inert with respect to the silicone fluid.

13. In a ferrous flywheel for use in a silicone fluid filled viscous torsional vibration damper, a ferrous flywheel body, a bronze bearing member carried by said body, and a non-ferrous protective coating on said bearing member.

14. In a rotary damper having a circular closed chamber therein provided with opposing axially facing surfaces, a silicone viscous damping fluid in said chamber, a circular inertia mass freely axially movable and rotatably housed within said chamber between said surfaces, axially facing surfaces on said inertia mass disposed, when the mass is centered between said chamber surfaces, in shear film spaced relation to said opposing surfaces within the chamber, and non-ferrous spacer ring means mounted upon said mass and affording spacer surfaces of narrow radial extent offset from the axially facing surfaces of said inertia mass, but normally in spaced relation to the opposing chamber surfaces less than said shear film spaced relation so as to permit slight free axial movement of the inertia mass within the chamber, said spacer means being operative as stops engageable with the opposing chamber surfaces during axial movements of the inertia mass within the chamber to maintain the major portions of the axially facing surfaces of the inertia mass out of rubbing contact with the opposing chamber surfaces.

15. In a rotary damper having a circular closed chamber therein provided with opposing axially facing surfaces and a central hub providing a radially outwardly facing surface, a viscous silicone damping fluid in said chamber, an annular inertia mass freely axially movable and rotatably housed within said chamber about said hub between said surfaces, axially facing surfaces on said inertia mass disposed, when the mass is centered between said chamber surfaces, in shear film spaced relation to said opposing chamber surfaces, and non-ferrous spacer ring and bearing means mounted upon the inner periphery of said inertia mass and forming spacer surfaces of narrow radial extent offset from the axially facing surfaces of the inertia mass, but normally in spaced relation to the opposing chamber surfaces less than said shear film spaced relation so as to permit slight free axial movement of the inertia mass within the chamber, said spacer and bearing means being bearingly engageable with the hub to support the inner diameter of the inertia mass free from contact with the hub and serving as stops engageable with the opposing chamber surfaces during axial movements of the inertia mass within the chamber to maintain the major portions of the axially facing surfaces of the inertia mass out of rubbing contact with the opposing chamber surfaces.

16. In a vibration damper including a closed housing having a chamber therein and an inertia member in said chamber, with parallel respective opposed relatively parallelly movable working surface areas on the inertia member and on the housing within said chamber disposed in shear film spaced relation having regard to the viscosity of a viscous damping fluid between said surface areas, said damping fluid in the presence of direct rubbing together of the material of the housing and inertia member tending to bind them together, the inertia member having, on a limited portion of the working surface areas thereof most liable to make direct frictional contact with the housing, a buffer member providing a surface of a material which is compatible with the damping fluid and is normally operatively spaced out of contact with an opposing working surface area portion of the housing but which may under some conditions in service rub thereagainst without causing a binding reaction of the fluid.

17. In a flywheel structure for use in a torsional viscous vibration damper, a circular flywheel member of ferrous material having a perimeter provided with a generally radially extending thrust shoulder projection spaced substantially from the opposite sides of the member, and a pair of non-ferrous bearing rings secured to said perimeter of the flywheel member and maintained by said thrust shoulder in predetermined spaced relation relative to one another and in predetermined relation to the sides of the member.

18. In a vibration damper including a closed housing having a chamber therein and an inertia member in said chamber, with parallel respective opposed relatively parallelly movable working surface areas on the inertia member and on the housing within said chamber disposed in shear film spaced relation having regard to the viscosity of a viscous damping fluid between said surface areas, said damping fluid in the presence of direct rubbing together of the material of the housing and inertia member tending to bind them together, one of said surface areas having, on a limited portion thereof most liable to make direct frictional contact with the opposed working surface area, a buffer structure providing a surface of a material which is compatible with the damping fluid and is normally operatively spaced out of contact with said opposed working surface area but which may under some conditions in service rub thereagainst without causing a binding reaction of the fluid.

References Cited in the file of this patent

UNITED STATES PATENTS

| | | |
|---|---|---|
| 1,729,026 | Bradley | Sept. 24, 1929 |
| 2,205,445 | Thege | June 25, 1940 |
| 2,514,136 | O'Connor | July 4, 1950 |

FOREIGN PATENTS

| | | |
|---|---|---|
| 280,574 | Germany | Nov. 21, 1914 |
| 542,112 | Germany | Jan. 20, 1932 |
| 305,527 | Great Britain | Nov. 21, 1929 |
| 506,970 | Great Britain | June 7, 1939 |